US007719610B2

United States Patent
Kung et al.

(12) United States Patent
(10) Patent No.: US 7,719,610 B2
(45) Date of Patent: May 18, 2010

(54) ROTATABLE CAMERA THAT MOVES A CAMERA LENS UNIT IN A PANNING OR TILTING MOTION BY A SINGLE MOTOR

(75) Inventors: Shao-Tsu Kung, Taipei (TW); Po-An Lin, Taipei (TW); Yung-Hui Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 407 days.

(21) Appl. No.: 11/902,819

(22) Filed: Sep. 26, 2007

(65) Prior Publication Data
US 2008/0079848 A1   Apr. 3, 2008

(30) Foreign Application Priority Data
Sep. 28, 2006   (TW)   ............... 95135993 A

(51) Int. Cl.
*H04N 5/225* (2006.01)
(52) U.S. Cl. .................. 348/373; 348/143; 348/374; 348/151
(58) Field of Classification Search ................. 348/143, 348/373, 374, 151
See application file for complete search history.

(56) References Cited

U.S. PATENT DOCUMENTS
6,147,701 A * 11/2000 Tamura et al. ............... 348/36
D550,738 S * 9/2007 Hsia ............................ D16/203
2002/0085844 A1* 7/2002 Tashiro et al. ............... 396/427
2005/0206779 A1* 9/2005 Aoki et al. ................... 348/373
2007/0041726 A1* 2/2007 Lee ............................. 396/427
2008/0008467 A1* 1/2008 Liu .............................. 396/427
2008/0174690 A1* 7/2008 Chang ......................... 348/345

* cited by examiner

*Primary Examiner*—James M Hannett
*Assistant Examiner*—Cynthia Calderon
(74) *Attorney, Agent, or Firm*—Bacon & Thomas, PLLC

(57) ABSTRACT

A rotatable camera has a motor, a lens unit comprising a photographing head and a driving rod coupled to the photographing head, a spherical bearing support for pivotally mounting the photographing head, and a rotatable disc driven in rotation motion by the motor to drive the driving rod of the lens unit move along a spiral shaped locus, and, when the motor is driven, the photographing head is at the same time driven by the driving rod to rotate and change its angular position, so that the rotatable camera employs only a single motor to drive the photographing head of the lens unit to rapidly move to the direction to be monitored, particularly, due to no time delay any corners shall be monitored by the rotatable camera.

2 Claims, 4 Drawing Sheets

ROTATABLE CAMERA THAT MOVES A CAMERA LENS UNIT IN A PANNING OR TILTING MOTION BY A SINGLE MOTOR

BACKGROUND OF THE INVENTION

1. Field of the Invention

The invention relates to a rotatable camera, particularly to a ball shaped camera equipped with only one motor for varying the angle of camera lens.

2. Description of the Related Art

In the current technology for designing a known ball shaped camera, two driving motors are commonly employed to make the camera lens able to move universally 360 degree. In the motorized mechanism of the ball shaped camera, one of the motors is for controlling the panning of the camera lens in horizontal direction while the other motor is for controlling the tilting of the camera lens in vertical direction so that the camera lens can move both in panning and tilting manner.

However, this type of ball shaped camera has the drawback that the panning and tilting of camera lens driven by two motors separately always causes the lens unable to reach the desired direction rapidly and precisely.

During scanning for monitoring, time delay is always resulted in the ball shaped camera unable to move the lens in time to the direction to be monitored that causes deficiency of monitoring and some corners neglected to be monitored.

SUMMARY OF THE INVENTION

Owing to the above, the major purpose of the present invention is to provide a camera with rotatable lens which employs only a single motor to drive the camera lens and move the lens rapidly to the direction to be monitored, and therefore will not cause any corner neglected to be monitored due to time delay.

The structure of the camera of the invention comprises a housing and a base seat pivotally connected to the housing, the housing has a lens unit, a spherical bearing support, a rotatable disc and a motor installed inside the housing, wherein the rotatable disc has a curved guiding pan and a spiral shaped rail formed on the guiding pan surface, the lens unit comprises a photographing head and a driving rod, and the photographing head is pivotally mounted inside the spherical bearing support with the end portion of the driving rod engaging and held by the spiral rail on the curved guiding pan; when the rotatable disc driven by the motor is in rotating motion, the driving rod will move along a spiral shaped locus following the spiral shaped rail on the curved guiding pan of the rotatable disc, and at the same time the photographing head is driven by the driving rod to rotate and change the angular position.

The camera of the invention also has a suspended cushion mechanism to provide cushion effect between the photographing head and the driving rod, when the driving rod moves in circular manner following a spiral shaped locus originated by the spiral shaped rail on the curved guiding pan of the rotatable disc, the suspended cushion mechanism can enable a smooth rotating motion of the photographing head of the lens unit inside the spherical bearing support.

DETAILED DESCRIPTION OF THE PREFERRED EMBODIMENT

Figure 1:
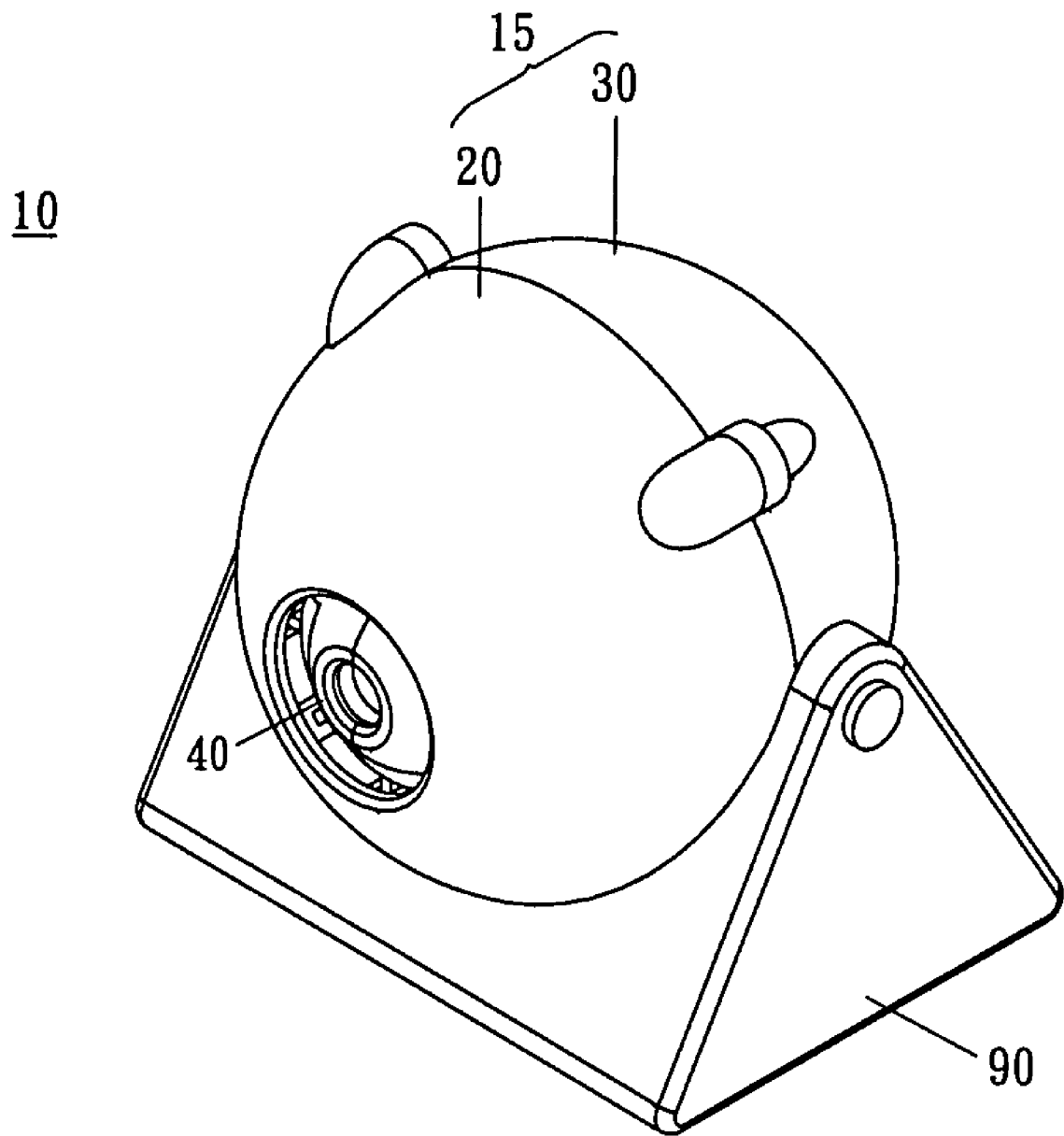
FIG. 1 is the schematic drawing of a rotatable camera disclosed in the invention.
Figure 2:
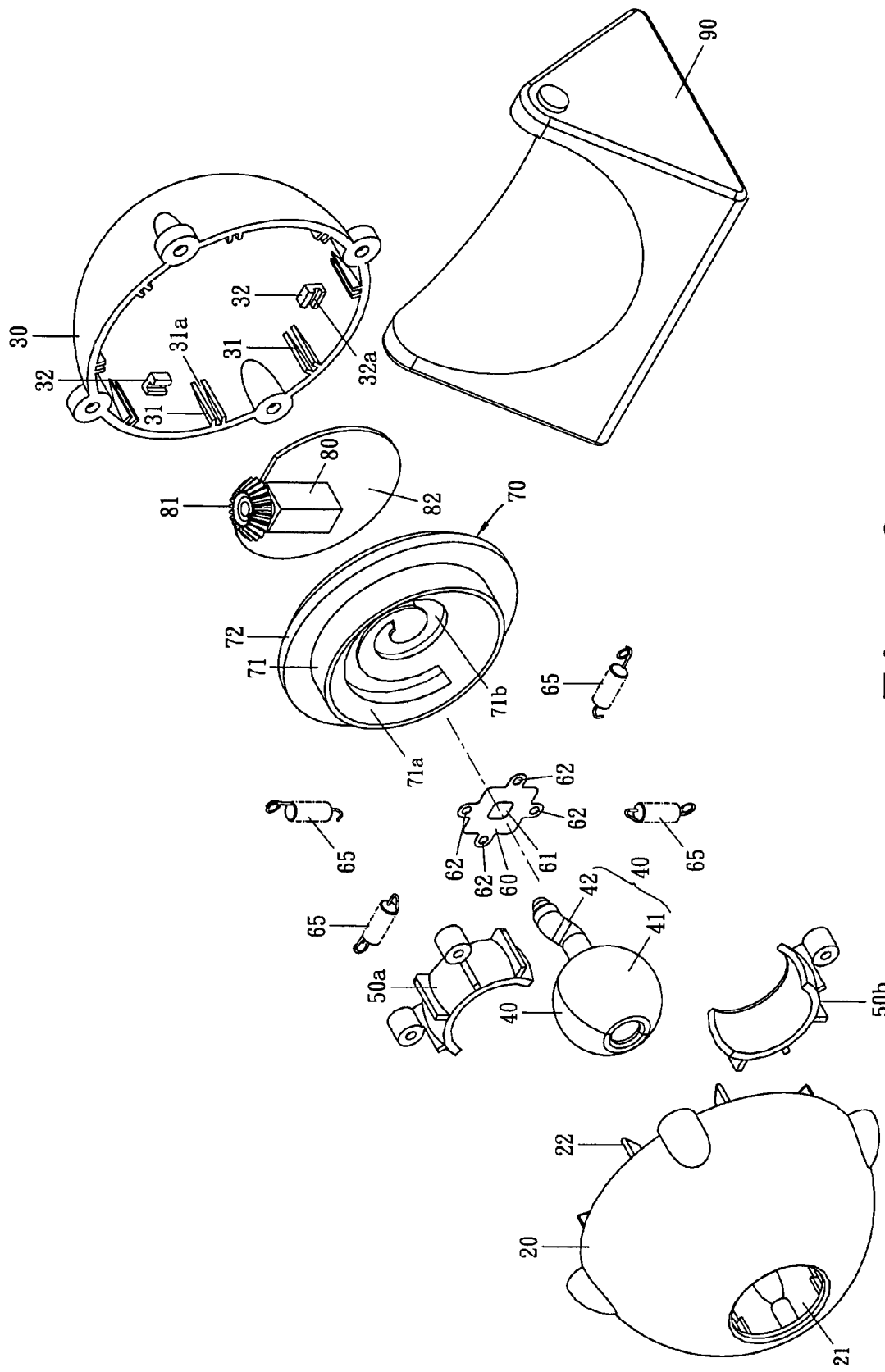
FIG. 2 is the disassembly drawing showing the parts and components of the camera shown in FIG. 1.
Figure 3:
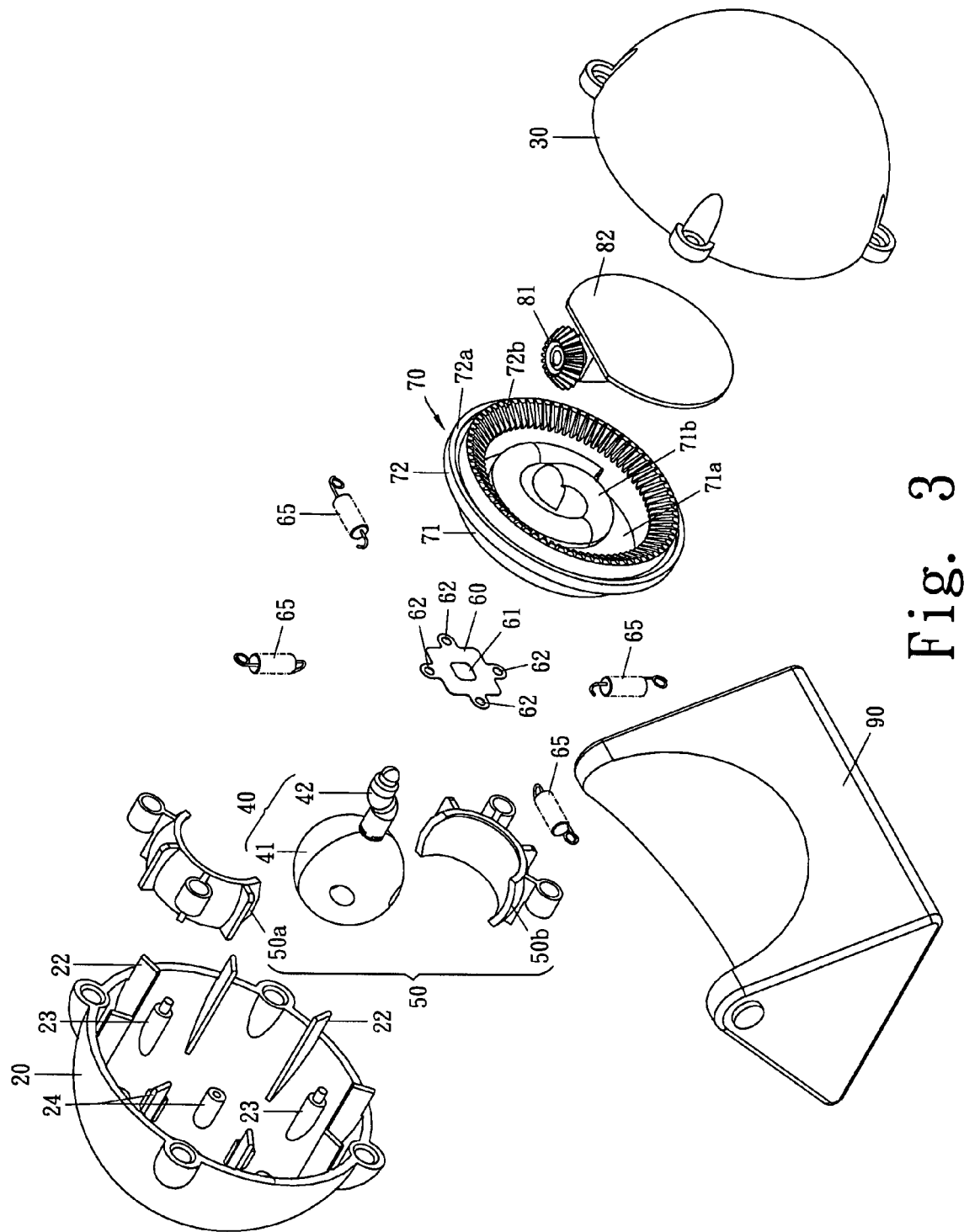
FIG. 3 is the disassembly drawing of the camera shown in FIG. 1 under different angle of vision.

As illustrated in from FIG. 1 to FIG. 4, a rotatable camera 10 of the invention comprises a housing 15, a base seat 90 and a lens unit 40 pivotally installed inside the housing 15, wherein the housing 15 comprises a front case 20 and a rear case 30, and in addition to the lens unit 40 the housing 15 also has a spherical bearing support 50, a suspended cushion mechanism 60, a rotatable disc 70 and a motor 80. When the motor 80 is running, the rotatable disc 70 is driven by the motor 80 to rotate which in turn drive the lens unit 40 to generate rotating and swinging motion.

The front case 20 is a half sphere shaped part having an opening 21, plural fixing fins 22, plural fixing studs 23 and rib case-portions 24 inside, wherein the fixing fins 22 are for engaging and connecting to the fixing slots 31a of rear case 30 and for enabling the rotating pan 70 to make a pivotal connection inside the rear case 30. The fixing studs 23 are for mounting one end of the spring element 65, and the rib-case portion 24 is for mounting the spherical bearing support 50.

The rear case 30 is a half sphere shaped part which can be connected to the front case 20 to form the housing 15. The rear case 30 has plural rib-plates 31 arranged in pair and stopping blocks 32 formed in the inner side wherein the paired rib-plates 31 of the rear case 30 form a fixing slot 31a inside for holding the fixing fins 22 of the front case 20. The stopping stud 32 has a groove 32a for engaging and holding the flange 72a of the rotatable disc 70.

The rotatable disc 70 has a curved guiding pan 71 and a hub ring 72. The curved guiding pan 71 has a spiral shaped rail 71a formed on one side, and the hub ring 72 has a ring shaped flange 72a with the edge extended downwardly and an inner bevel ring gear 72b formed on the inner side.

The rotatable disc is installed on the rear housing 30 in such a way that the flange 72a of the rotatable disc 70 engages into the groove 32a of the stopping block 32 of the rear case 30. When the front case 20 is connected to the rear case 30 to form the housing 15, the fixing fin 22 of the front case 20 passes through the fixing slot 31 of the rear case 31 and reaches the upper side of the rotatable disc 70. This type of arrangement enables the rotatable disc 70 to make a pivotal connection for free rotation inside the rear case 30.

The motor 80 is mounted on a support 82 which is installed inside the rear case 30, a level gear 81 is mounted on the shaft of the motor 80 and engages the inner bevel ring gear 72b to form a set of bevel gear driving system through which the rotatable disc 70 can be driven by the driving motor 80.

The lens unit 40 comprises a photographing head 41 and a driving rod 42 wherein the photographing head 41 is in ball shape, and the driving rod 42 is connected to the photographing head 41.

The spherical bearing support 50 comprises two bearing seat 50a and 50b which form a pair of mounting support to hold the photographing head 41 of the lens unit 40 in position, allowing the photographing head 41 to rotate freely on the spherical bearing support 50.

Figure 4:
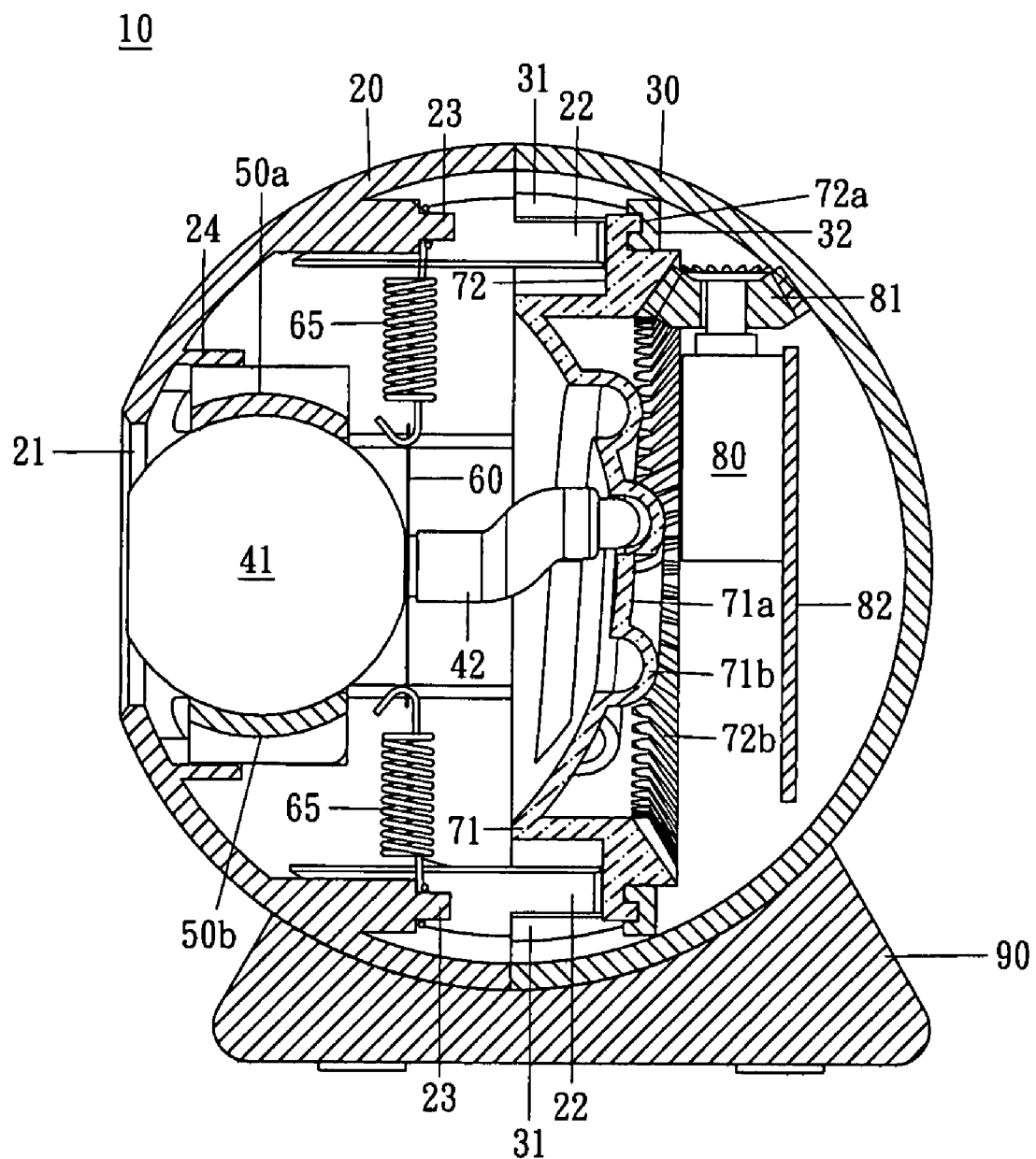
FIG. 4 is a sectional drawing of the camera shown in FIG. 1 to show the internal structure and parts assembly.

As shown in FIG. 4, the lens unit 41 is pivotally mounted to the rib-case portion 24 of the front case 20 by the spherical bearing support 50, and the photographing head 41 can take picture through the opening 21 of the front case 20.

The suspended cushion mechanism 60 comprises a spring holding plate 61 and more than two pieces of spring element 65. The spring holding plate 61 has a center hole 62 and more than two hanging holes 63 arranged symmetrically in the positions opposite to each other.

As shown in FIG. 4 the center hole 62 of the spring holding plate 61 is designed for providing the passage for the driving rod 42 of the lens unit 40 inside the front case 20 to pass through and the space for installing the driving rode 42, and the two hanging holes 63 on the spring holding plate 61 are for connecting the spring elements 65.

By the effect of the spring elements 65 installed to connect the fixing stud 23 of the front case 20 and the hanging hole 63 on the spring holding plate 61, the spring holding plate 61 is hung inside the front case 20 to form the suspended cushion mechanism 60, particularly the suspended cushion mechanism 60 can provide cushion effect on the connections of photographing head 41 and the driving rod 42 of the lens unit 40. When photographing head 41 of the lens unit 40 is driven by the driving rod 42 and moving universally inside the spherical bearing support 50, the suspended cushion mechanism 60 can keep the force applied on the photographing head 41 in balance condition at any angular position so that the photographing head 41 may move smoothly in the spherical bearing support 50.

When the front case 20 is connected to the rear case 30 to form the housing 30, the end portion of the driving rod 42 of the lens unit 40 is fitted into the spiral shaped rail 71a of the curved guiding pan 71 of the rotatable disc 70. When the rotatable disc 70 is driven by the motor 80 and in rotating motion, the driving rod 42 will move in swinging manner following a spiral locus along the spiral rail 71a of the curved guiding pan 71.

As shown in FIG. 4, the camera 10 of the invention employs only one motor 80 to control the angular position and shooting angle of the lens unit 40. When the motor 80 is running, the bevel gear 81 on the motor shaft will drive the inner bevel ring gear 72a of the rotatable disc 70 to be rotated, and at the same time the rotating spiral rail 71a of the curved guiding pan 71 of the rotatable disc 70 forces the driving rod 42 of the lens unit 40 to swing in a manner following a spiral shaped locus under the cushion effect of the suspended cushion mechanism 60, so that the photographing head 41 of the lens unit 40 will rotate in the spherical bearing support 50 and is able to vary the angular position in miniature degree.

Since the camera 10 of the invention employs only a single motor 80 to drive the photographing head 41 of the lens unit, the photographing head 41 may be rapidly and precisely brought to the desired direction of monitoring that can avoid causing time delay during monitoring, and increase monitoring efficiency.

What is claimed is:

1. A rotatable camera comprising:
   a housing comprises a front case and a rear case, a plurality of fixing fins and fib-case portions formed inside the front case and a plurality of fixing slots and stopping blocks formed inside the rear case, each stopping block has a groove for engaging and holding an edge of a ring shaped flange of a hub ring;
   a rotatable disc has a curved guiding pan and the hub ring, the curved guiding pan has a spiral shaped rail formed thereon, and the hub ring has the ring shaped flange with the edge extended downwardly and an inner bevel ring gear formed on inner side, and the fixing fins of the front case pass through the fixing slot and reach the upper side of the rotatable disc;
   a lens unit comprises a photographing head and a driving rod which is joined to the photographing head and its end is engaged and held by the spiral shaped rail of the curved guiding pan of the rotatable disc;
   a spherical beating support is installed on the rib-case position of the front case, and provides means for mounting the photographing head pivotally on the spherical bearing support;
   a motor is fixed inside the rear case, and a level gear is mounted on a shaft of the motor and engages the inner bevel ring gear of the rotatable disc; and a base seat pivotally connected to the housing.

2. The rotatable camera as described in claim 1, wherein the front case has a suspended cushion mechanism which comprises a spring holding plate and more than two spring elements, wherein the spring holding plate has a center hole for installing and accommodating the driving rod of the lens unit and is held in suspended manner by the spring elements inside the front case.

* * * * *